United States Patent
Komissar et al.

(10) Patent No.: US 11,048,616 B2
(45) Date of Patent: Jun. 29, 2021

(54) MEMORY LEAK DETECTION

(71) Applicant: BMC SOFTWARE, INC., Houston, TX (US)

(72) Inventors: Gilad Arbel Komissar, Malkiya (IL); Eyal Koren, Dafna (IL); Asaf Dafner, Gedera (IL)

(73) Assignee: BMC Software, Inc., Houston, TX (US)

(*) Notice: Subject to any disclaimer, the term of this patent is extended or adjusted under 35 U.S.C. 154(b) by 50 days.

(21) Appl. No.: 14/640,581

(22) Filed: Mar. 6, 2015

(65) Prior Publication Data
US 2015/0186644 A1  Jul. 2, 2015

Related U.S. Application Data

(63) Continuation of application No. 13/732,197, filed on Dec. 31, 2012, now Pat. No. 9,003,233.

(51) Int. Cl.
*G06F 11/00* (2006.01)
*G06F 11/36* (2006.01)
*G06F 11/30* (2006.01)

(52) U.S. Cl.
CPC ...... *G06F 11/3636* (2013.01); *G06F 11/3037* (2013.01); *G06F 11/36* (2013.01); *G06F 11/366* (2013.01)

(58) Field of Classification Search
CPC .... G06F 11/3037; G06F 11/36; G06F 11/366; G06F 11/302; G06F 11/362; G06F 11/3612; G06F 11/3616
See application file for complete search history.

(56) References Cited

U.S. PATENT DOCUMENTS

| | | | |
|---|---|---|---|
| 7,234,080 B2 | 6/2007 | Cirne et al. | |
| 7,434,206 B2 | 10/2008 | Seidman et al. | |
| 7,827,538 B2 | 11/2010 | Trotter | |
| 7,971,010 B2* | 6/2011 | Schmelter | G06F 11/3466 707/816 |
| 7,979,748 B2 | 7/2011 | Brady | |
| 8,037,477 B2 | 10/2011 | Findeisen et al. | |

(Continued)

OTHER PUBLICATIONS

The Java Tutorials, retrieved from the Wayback Machine captured Nov. 14, 2011, Oracle, all pages.*

(Continued)

*Primary Examiner* — Marc Duncan
(74) *Attorney, Agent, or Firm* — Brake Hughes Bellermann LLP (57) ABSTRACT

In accordance with aspects of the disclosure, systems and methods are provided for monitoring one or more classes for detecting suspected memory leaks in a production environment. The systems and methods may include identifying which of the one or more classes hold at least one static or non-static field of collection or array type, accessing the one or more classes that hold the at least one static or non-static fields of collection or array type, and tracking a size for each field of each class by periodically sampling the size of each field over an interval, processing the size data for each field of each class, and detecting suspected memory leaks of each class by identifying which of the one or more fields of each class exhibits suspect behavior in the size over the interval.

20 Claims, 5 Drawing Sheets

(56) References Cited

U.S. PATENT DOCUMENTS

| | | | |
|---|---|---|---|
| 8,473,789 B2 | 6/2013 | Callaghan et al. | |
| 8,522,216 B2 | 8/2013 | Otenko | |
| 9,003,233 B2 | 4/2015 | Komissar et al. | |
| 9,454,454 B2* | 9/2016 | Abraham | G06F 11/3612 |
| 2004/0078540 A1* | 4/2004 | Cirne | G06F 11/3476 |
| | | | 711/170 |
| 2005/0091646 A1 | 4/2005 | Chilimbi et al. | |
| 2005/0204341 A1 | 9/2005 | Broussard | |
| 2006/0095427 A1 | 5/2006 | Dickenson | |
| 2006/0136530 A1 | 6/2006 | Rossmann | |
| 2006/0206885 A1* | 9/2006 | Seidman | G06F 11/076 |
| | | | 717/148 |
| 2007/0067758 A1 | 3/2007 | Findeisen et al. | |
| 2008/0244547 A1* | 10/2008 | Wintergerst | G06F 11/3466 |
| | | | 717/158 |
| 2009/0328007 A1* | 12/2009 | Chen | G06F 11/3636 |
| | | | 717/128 |
| 2010/0211754 A1 | 8/2010 | Crosby et al. | |
| 2011/0029822 A1* | 2/2011 | Moser | G06F 11/3636 |
| | | | 714/45 |
| 2011/0276833 A1 | 11/2011 | Otenko | |
| 2011/0276949 A1* | 11/2011 | Otenko | G06F 11/3452 |
| | | | 717/131 |
| 2013/0145220 A1 | 6/2013 | Lv | |
| 2014/0189438 A1 | 7/2014 | Komissar et al. | |

OTHER PUBLICATIONS

Mitchell, Nick and Gary Sevitsky, LeakBot: An Automated and Lightweight Tool for Diagnosing Memory Leaks in Large Java Applications, 2003, Springer-Verlag Berling Heidelberg, pp. 351-377.*

Xu, Guoqing and Atanas Rountev, Precise Memory leak Detection for Java Software Using Container Profiling, 2008, retrieved from ACM, pp. 151-160.*

Shaham, Ran, Automatic Removal of Array Memory Leaks in Java, Sep. 1999, Tel-Aviv University, pp. 1-44.*

Non-Final Office Action received for U.S. Appl. No. 13/732,197, dated Aug. 20, 2014, 11 pages.

Response to Non-Final Office Action for U.S. Appl. No. 13/732,197, filed Nov. 20, 2014, 11 pages.

Notice of Allowance received for U.S. Appl. No. 13/732,197, dated Dec. 8, 2014, 5 pages.

"Collections in Java", HowToDoInJava, retrieved from https://howtodoinjava.com/java-collections/. Jan. 1, 2016, 8 pages.

Jenkov: "Java Fields", retrieved from http://tutorials.jenkov.com/java/fields.html, Mar. 3, 2015, 7 pages.

* cited by examiner

MEMORY LEAK DETECTION

CROSS-REFERENCE TO RELATED APPLICATIONS

This application is a continuation of and claims priority under 35 U.S.C. § 120 to U.S. application Ser. No. 13/732,197, filed on Dec. 31, 2012, and entitled "MEMORY LEAK DETECTION", the contents of which are hereby incorporated by reference.

TECHNICAL FIELD

The present description relates to computer-based techniques for memory leak detection.

BACKGROUND

In computer related processes, a memory leak may arise when a software application or program holds memory for some use yet does not release the held memory back to the operating system. In some instances, a memory leak may manifest when an object is stored in memory and cannot be accessed by the process of the software application or program. In other instances, the opposite may occur where a reference to an object that is no longer needed may be held by a software application or program, which may inhibit the object from being garbage collected and thus create a memory leak. Further, memory leaks may be destructive due to their ability to exhaust available memory resources during execution of applications or programs, and memory leaks may negatively impact system performance. For instance, a memory leak may diminish performance by reducing availability of memory, and in some instances, a large portion of available memory may be allocated thereby causing parts of a system to cease working properly, causing an application or program to crash, and/or causing a system to become restrained and unexpectedly perform sluggishly. Generally, with conventional techniques, a memory leak may only be diagnosed by a programmer or operator with access to the source code of the application or program. Therefore, there currently exists a need to improve memory leak detection techniques and reduce the affects of memory leaks or leakage on system performance.

SUMMARY

In accordance with aspects of the disclosure, a computer system may be provided for memory leak detection including instructions stored on a non-transitory computer-readable medium and executable by at least one processor. The system may include a collection sizes tracker configured to cause the at least one processor to monitor one or more containing classes for detecting suspected memory leaks in a production environment. The collection sizes tracker may include an instrumentation manager configured to identify which of the one or more containing classes hold at least one static or non-static field of collection or array type. The collection sizes tracker may include a polling mechanism configured to access the one or more containing classes that hold the at least one static or non-static fields of collection or array type, and track a size for each field of each containing class by periodically sampling size data of each field over an interval, the one or more fields of each containing class enabling instances of each containing class to maintain at least one of state and behavior. The collection sizes tracker may include an algorithm handler configured to process the size data for each field of each containing class from the polling mechanism and detect suspected memory leaks of each containing class by identifying which of the one or more fields of each containing class exhibits suspect behavior in the size over the interval.

In accordance with aspects of the disclosure, a computer-implemented method may be provided for memory leak detection. In an implementation, the method may include monitoring one or more classes (containing classes) in a production environment and identifying which of the one or more classes (containing classes) hold at least one static or non-static field of collection or array type. The method may include accessing the one or more classes (containing classes) that hold the at least one static or non-static fields of collection or array type and tracking a size for each field of each class (containing class) by periodically sampling size data of each field over an interval, the one or more fields of each class (containing class) enabling instances of each class (containing class) to maintain at least one of state and behavior. The method may include processing the size data for each field of each class (containing class) and detecting suspected memory leaks of each class (containing class) by identifying which of the one or more fields of each class (containing class) exhibits suspect behavior in the size over the interval.

In accordance with aspects of the disclosure, a computer program product may be provided, wherein the computer program product is tangibly embodied on a computer-readable storage medium and includes instructions that, when executed by at least one processor, may be configured to monitor one or more containing classes in a production environment and identify which of the one or more containing classes hold at least one static or non-static field of collection or array type. The instructions, when executed by the at least one processor, may be further configured to access the one or more containing classes that hold the at least one static or non-static fields of collection or array type and track a size for each field of each containing class by periodically sampling size data of each field over an interval, the one or more fields of each containing class enabling instances of each containing class to maintain at least one of state and behavior. The instructions, when executed by the at least one processor, may be further configured to process the size data for each field of each containing class and detect suspected memory leaks of each containing class by identifying which of the one or more fields of each containing class exhibits suspect behavior in the size over the interval.

The details of one or more implementations are set forth in the accompanying drawings and the description below. Other features will be apparent from the description and drawings, and from the claims.

DETAILED DESCRIPTION

In various implementations, aspects of the disclosure provide a system and methods for detecting memory leaks that may result from growth of collections and/or arrays by tracking their field sizes through classes (containing classes). In this manner, classes identified to contain collections and/or arrays may be tracked, and the sizes of the collections and/or arrays may be checked periodically and tracked without great impact on performance. These periodical size samplings may be utilized as input to an algorithm to determine possible or potential memory leaks. Further, an output of this process may include potential memory leaks information regarding not only the collection and/or array that is suspect, but regarding classes (containing classes) and/or instances thereof.

Figure 1:
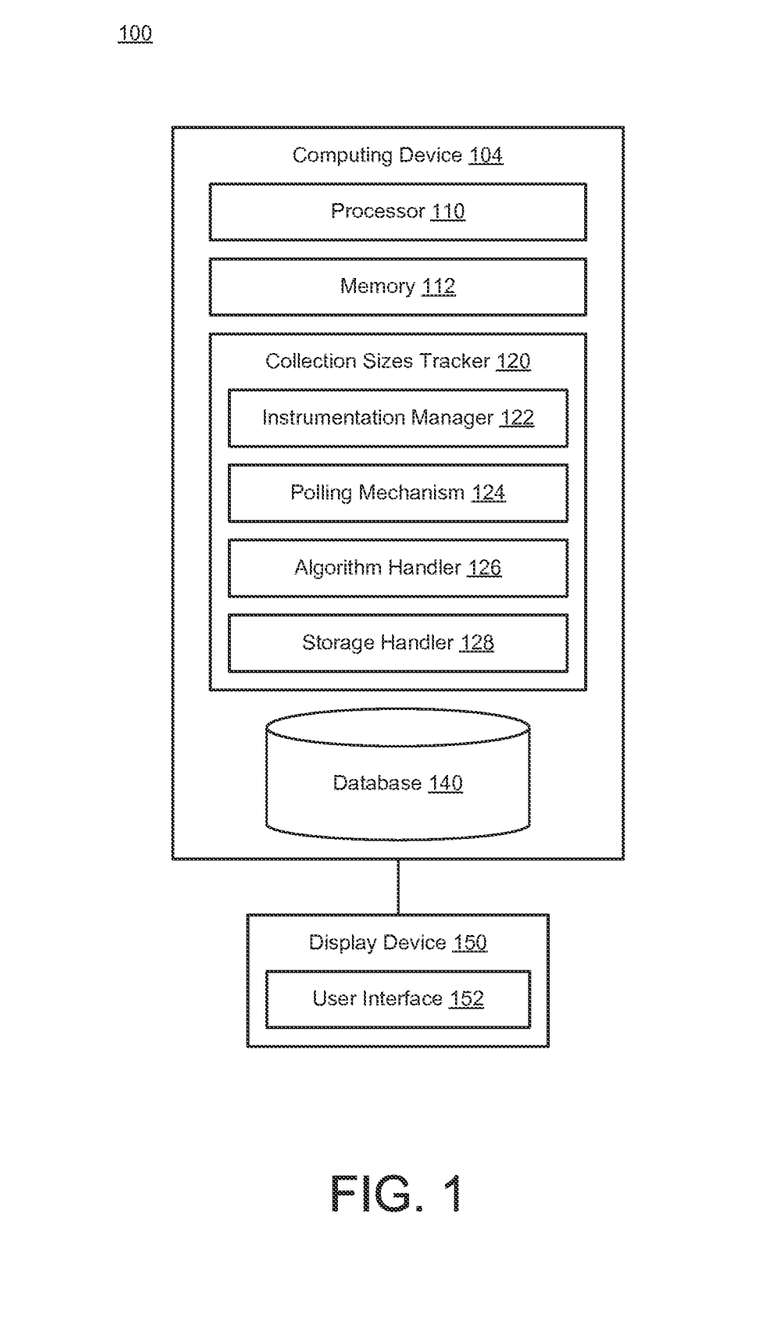
FIG. 1 is a block diagram illustrating an example system for memory leak detection, in accordance with aspects of the disclosure.

FIG. 1 is a block diagram illustrating an example system 100 for memory leak detection, in accordance with aspects of the disclosure.

In the example of FIG. 1, the system 100 comprises a computer system for implementing a memory leak detection system that may be associated with a computing device 104, thereby transforming the computing device 104 into a special purpose machine designed to determine and implement memory leak detection process(es), as described herein. In this sense, it may be appreciated that the computing device 104 may include any standard element(s) and/or component(s), including at least one processor(s) 110, memory (e.g., non-transitory computer-readable storage medium) 112, one or more optional database(s) 140, power, peripherals, and various other computing elements and/or components that may not be specifically shown in FIG. 1. Further, the system 100 may be associated with a display device 150 (e.g., a monitor or other display) that may be used to provide a user interface (UI) 152, such as a graphical user interface (GUI). In an implementation, the UI 152 may be used to receive preferences from a user for managing or utilizing the system 100. As such, it should be appreciated that various other elements and/or components of the system 100 that may be useful to implement the system 100 may be added or included, as would be apparent to one of ordinary skill in the art.

Accordingly, in the example of FIG. 1, the memory leak detection system 100 may include the computing device 104 and instructions recorded on the memory 112 (non-transitory computer-readable medium) and executable by the at least one processor 110. Further, the memory leak detection system 100 may include the display device 150 for providing output to a user, and the display device 150 may include the user interface (UI) 152 for receiving input from the user.

As shown in the example of FIG. 1, the memory leak detection system 100 may include a collection sizes tracker 120 configured to cause the at least one processor 110 to monitor one or more classes (containing classes) for detecting suspected memory leaks in a production environment. In various examples, a memory leak or memory leakage may develop when an application or other software program reserves memory for an instance of a class (e.g., classes having collections and/or arrays of objects) but then does not clean or release the reserved memory to the operating system. For instance, in some situations, a memory leak or memory leakage may transpire when an object is stored in memory and may be accessible by code when not needed anymore, thus preventing the object from being garbage collected. Further, since memory leaks have potential for exhausting available system memory during code execution, memory leaks may thus cause or at least contribute to diminished performance, efficiency, and reliability.

In an example, production environment may describe an implementation of software applications and programs into operation for their intended purpose and use by users including administrators and operators. For instance, a production environment may be referred to as a real-time setting where software applications and programs are executed to interface with hardware operations.

In an example, a class may be considered a construct used for creating instances of itself, which may be referred to as instances and/or objects, and a class may be configured to define members that enable its instances and/or objects to have state and behavior. These members may include data field members (e.g., member variables or instance variables) that enable a class instance to maintain state, and other types of members may enable behavior of class instances. Further, a class may be configured to define a type of their instances, wherein the type may include classification for identifying a type of data, operations that may be performed on values of the type of data, and a manner in which values of that type of data may be stored. In some examples, classes may be represented as blocks in object-oriented programming languages, such as Java, and these blocks may be referred to as blueprints of what objects look like.

In an example, objects may include data and one or more processes for using the data, wherein objects may refer to data structures along with their associated processing routines. In some examples, objects may be considered instances of classes, wherein classes may define properties and behavior for multiple instances thereof. As such, an object may include set of specific properties, attributes, behaviors, etc., and objects need to be constructed. Further, objects are used in object-oriented programming and related software development as abstract data structures to integrate data with processes to manipulate the data. For example, objects in object-oriented programming are used for inheritance to thereby improve program integrity and reliability.

In an example, a container may include a class (containing class) having members that are collections of other objects. As such, containers (containing classes) may be used for storing objects in an organized manner, and thus, containers (containing classes) may be utilized to hold collections of objects. The size of the container (containing class) may depend on a number of "contained" objects. Therefore, depending on the size and processes for implementing the "contained" objects, a container (containing class) may achieve active growth in size or actively diminish in size, which may affect the reliability and efficient use of the container (containing class).

In the example of FIG. 1, the collection sizes tracker 120 may include an instrumentation manager 122 configured to identify which of the one or more containing classes hold at least one static or non-static field of collection or array type. In an implementation, the instrumentation manager 122 may be configured to modify code for the one or more containing classes that hold at least one static or non-static field of collection or array type. Further, the one or more fields of each containing class may be configured to enable instances of each containing class to maintain at least one of state and behavior. In an implementation, instrumentation may refer to an ability to monitor or measure a level of performance to diagnose errors and trace information. In another implementation, instrumentation may be implemented in a form of code instructions that may be configured to monitor or measure specific components or operations in a system and further used to review performance of an application. In another implementation, instrumentation may be considered an industry term that may refer to modifying a class at run time, such as, for example, by either changing instructions of methods and/or their behavior or, in another example, by modifying the classes' fields.

In an example, data having multiple parts, elements, or components may be divided into multiple fields or filed members. Further, data may be arranged as sets of database records, wherein each record may include multiple fields. In some examples, a field (which may be referred to as a data member or member variable) may include data contained within a class instance or an object. In various examples, static fields may be associated with a class, and static fields may not be associated with an object of the class, wherein a static field may be initialized when the class is loaded at runtime. In various other examples, non-static fields may be instance fields of an object, and non-static fields may only be accessed or invoked through an object reference. Further, a value of a static field may remain constant throughout the class, and a value of a non-static field may change as objects may have their own instance of these fields.

In various examples, when a field is static, a same field, memory location, and value may be used for all instances of a class. This field may be created once per class. When a field is not static, a different memory location may be used for each of the class's instances. Each instance field may hold a different value. The field may be created once per instance. Aspects of the disclosure are related to tracking containing class(es) and periodically sampling static Collection/array fields' sizes of each tracked class. Aspects of the disclosure are also related to tracking containing class's instances. For each instance, non-static Collection/array fields sizes may be sampled.

In various examples, a collection may be referred to as a grouping of any number of data items that may have a shared significance to working a problem in a controlled manner. The data items may be of a same type and may be derived through inheritance. In some examples, a collection may be include abstract data types, and types of collections may include one or more of lists, sets, multi-sets, trees, graphs, etc.

In an example, an array type may be referred to as a data type that may be configured to describe a collection of elements (e.g., values or variables). In an array type, each element may be selected by one or more indices that may be determined or identified at time of execution by a software application or program. Such a collection may be referred to as an array variable, array value, or an array. In some examples, a fixed-size array may or may not be considered a collection due to holding a fixed number of data items, and a variable-sized array may be considered a collection.

In the example of FIG. 1, the collection sizes tracker 120 may include a polling mechanism 124 configured to access the one or more containing classes that hold the at least one static or non-static fields of collection or array type and track a size for each field of each containing class by periodically sampling size data of each field over an interval (e.g., any number of seconds, minutes, etc.). The size may include any number of objects held by the static or non-static field of collection or array type.

In an implementation, the polling mechanism 124 may be configured to search for and discover one or more containing classes including class instances (objects) having at least one static or non-static field of collection or array type. In an example, an instance (or class instance) may refer to an occurrence or a copy of an object, and instances of a particular class may share one or more attributes. Further, in another example, a description of a class may list or itemize attributes and define one or more operations, actions, and/or processes relevant for the class.

In an implementation, the polling mechanism 124 may be configured to stop tracking the one or more fields of each containing class that do not exhibit suspect behavior in the size over the interval. Further, the polling mechanism 124 may be configured to stop tracking classes and/or instances thereof that do not show memory leak behavior or characteristics, including uninteresting classes and/or instances thereof, such as, for example, classes and/or instances thereof that attenuate or do not show any significant growth in their collections.

In an implementation, the polling mechanism 124 may be configured to track only the containing classes having the at least one static or non-static fields of collection or array type. For instance, the polling mechanism 124 may utilize memory leak detection to identify containing classes (containers) having collections that exhibit suspect behavior, such as constant growth in size, and mark these collections as having potential memory leaks. Other containing classes (containers) not exhibiting this suspect behavior over a number of periodic size samples may be discarded or at least no longer tracked, and as such, their collections sizes may not be polled anymore. Further, in some implementations, the polling mechanism 124 may be configured to determine a baseline memory usage for classes and/or instances thereof that may be used to detect abnormal behavior in terms of memory consumption.

In an implementation, the polling mechanism 124 may be configured to analyze the suspect behavior in the size of the one or more containing classes by testing each static or non-static field of collection or array type of each containing class for constant growth behavior over the interval including a periodic interval to detect suspected memory leaks that result from constant growth of each static or non-static field of collection or array type. Further, the polling mechanism 124 may be configured to track only specific containing classes that exhibit constant growth behavior of the size (or size data) over the periodic interval.

In an implementation, the collection sizes tracker 120 (or, in another implementation, the instrumentation manager 122) may be configured to analyze (via the polling mechanism 124) each class including each containing class and look for fields (members) that are collections or that are array types. If there are no such fields, then the class is not considered interesting and may be ignored. However, if there are such fields (either static or non-static), than the class is considered interesting, and this interesting class and its fields of collection or array type may be kept or held (with weak references so that this class may be garbage collected when necessary).

In accordance with aspects of the disclosure, if the size of one or more objects in a class are increasing in size, then these objects in this class may be considered interesting, and these objects may be considered as suspect for memory leaks. Further, if the size of one or more objects in a class are decreasing in size, then these objects in this class may be considered uninteresting or non-interesting, and these objects may not be considered as suspect for memory leaks.

In the example of FIG. 1, the collection sizes tracker 120 may include an algorithm handler 126 configured to process the size data for each field of each containing class from the polling mechanism 124 and detect suspected memory leaks of each containing class by identifying which of the one or more fields of each containing class exhibits suspect behavior in the size over the interval. In an implementation, processing the size data for each field of each containing class may include acquiring the size or size data for each field of each containing class. The algorithm handler 126 may be configured to mark the one or more fields of each containing class that are identified to exhibit suspect behavior in the size over the interval.

In an implementation, identifying which of the one or more fields of each containing class exhibit suspect behavior may include identifying which of the one or more fields of each containing class exhibits constant growth behavior in the size over the interval. Further, identifying which of the one or more fields of each containing class exhibit suspect behavior may include identifying which of the one or more fields of each containing class are suspected of exhibiting a potential growth trend. In some examples, the algorithm handler 126 may not specifically identify constant growth, and as such, the algorithm handler 126 may be configured to identify which classes and/or instances thereof exhibit behavior making it a candidate for a source of memory leak.

In the example of FIG. 1, the collection sizes tracker 120 may include a storage handler 128 configured to store information for, or at least relating to the one or more containing classes. For instance, the storage handler 128 may be configured to store information for each containing class having suspected memory leaks. In another instance, the storage handler 128 may be configured to store information for each of the one or more fields of each containing class that are identified to exhibit suspect behavior in the size over the interval. In another instance, the storage handler 128 may be configured to store information for each result that pinpoints a suspected memory leak to a specific field in a specific containing class. In various implementations, the storage handler 128 may be configured to store information in various memory components, such as, for example, the memory 112 and/or the one or more optional database(s) 140.

In an implementation, the collection sizes tracker 120 may be configured to identify or determine a suspected memory leak metric by estimating the size of the memory that is suspected as a leak. Referring to escalation, when identifying a growing trend in the memory usage metric, the interval between periodic size samples may be adjusted (e.g., raised or lowered), and any amount of data may be kept or stored.

Further, the collection sizes tracker 120 may be configured to provide a collection tracking view for providing information of collections exhibiting suspect behavior, such as, for example, constant growth. The collection sizes tracker 120 may be configured to provide the collection tracking view via the display device 150 and include any relevant information related to suspect behavior.

In accordance with aspects of the disclosure, the collection sizes tracker 120 may be configured to find classes that have collection and/or array type fields, track these classes' collection field sizes, and identify possible or potential memory leaks by, for example, identifying a growing trend (e.g., increasing field sizes) in a memory usage metric for each class, each class instance, and/or each class object. As such, any impact on performance may be low, since in some examples, the collections sizes tracker 120 may only be tracking specific instances of specific classes that exhibit or show growth (e.g., increasing field sizes), wherein if an instance is not exhibiting or showing growth (e.g., static or decreasing field sizes), then tracking may be no longer needed and stopped or terminated.

Further, in the example of FIG. 1, the collection sizes tracker 120 may be configured to use various other types of data stored in the optional database 140 related to class and/or instances thereof including containing classes and containing class instances thereof, which may be known or thought to influence, control, and/or otherwise constrain operations of the collections sizes tracker 120 and components thereof. It should also be appreciated that any example data is intended merely as non-limiting examples, and any additional and/or alternative types of data may be used in the operations of the collection sizes tracker 120. For instance, data may be stored, e.g., in the one or more optional databases 140 and/or elsewhere including the memory 112.

In the example of FIG. 1, it should be appreciated that the memory leak detection system 100 is shown using various functional blocks or modules that represent more-or-less discrete functionality. However, such illustration is provided for clarity and convenience, and therefore, it should be appreciated that the various functionalities may overlap or may be combined within a described block(s) or module(s), and/or may be implemented by one or more block(s) or module(s) not specifically shown in the example of FIG. 1. Generally, it should be appreciated that conventional functionality that may be considered useful to the system 100 of FIG. 1 may be included as well even though such conventional elements are not shown explicitly, for sake of clarity and convenience.

Figure 2:
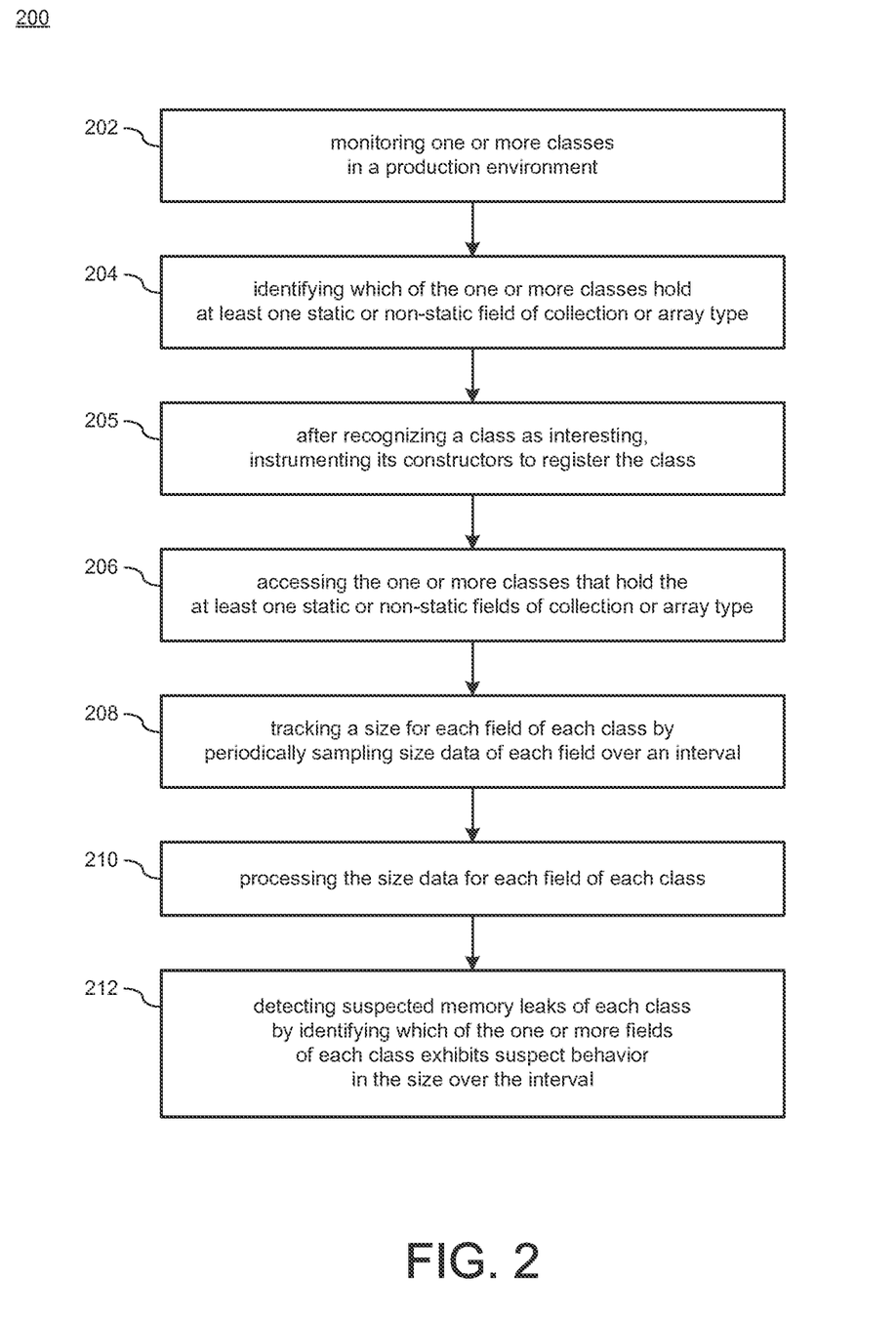
FIG. 2 is a process flow diagram illustrating an example method for memory leak detection, in accordance with aspects of the disclosure.

FIG. 2 is a process flow illustrating an example method 200 for memory leak detection, in accordance with aspects of the disclosure.

In the example of FIG. 2, operations 202-212 are illustrated as a series of discrete operations occurring in sequential order. However, in other implementations, two or more of the operations 202-212 may occur in a partially or completely overlapping or parallel manner, or in a nested or looped manner, or may occur in a different order than that shown. Further, additional operations, that may not be specifically shown in the example of FIG. 2, may be included in some other implementations, while, in still other implementations, one or more of the operations 202-212 may be omitted.

Moreover, in various other implementations, the method 200 may include a process flow for a computer-implemented method for memory leak detection in the system 100 of FIG. 1. Further, as described herein, the operations 202-212 may provide a simplified operational process flow that may be enacted by the computer device 104 to provide features and functionalities as described in reference to FIG. 1.

In the example of FIG. 2, at 202, the method 200 may include monitoring one or more classes (containers or containing classes) in a production environment. In an implementation, the method 200 may be configured to look at (e.g., observe and/or survey) classes to determine which class(es) may be considered "interesting" classes or containing classes that should be followed or monitored. At 204, the method 200 may include identifying which of the one or more containing classes hold at least one static or non-static field of collection or array type. At 205, the method 200 may include, after recognizing a class as interesting, instrumenting its constructors to register the class with the CollectionSizesTracker class. This may include use of an instrumentation bit. At 206, the method 200 may include accessing the one or more containing classes that hold the at least one static or non-static fields of collection or array type.

Further, at 208, the method 200 may include tracking a size for each field of each containing class instance by periodically sampling the size data of each field over an interval. In an example, the one or more fields of each containing class enabling instances of each containing class to maintain at least one of state and behavior. At 210, the method 200 may include processing the size data for each (static or non-static) field of each containing class. In an implementation, processing the size data for each (static or non-static) field of each containing class may include acquiring and/or receiving the size or size data for each (static or non-static) field of each containing class. At 212, the method 200 may include detecting suspected memory leaks of each containing class by identifying which of the one or more fields of each containing class exhibits suspect behavior in the size over the interval.

In an implementation, the method 200 may include modifying code for the one or more containing classes that hold at least one static or non-static field of collection or array type. The size may include a number of objects held by the static or non-static field of collection or array type. Further, identifying which of the one or more fields of each containing class exhibit suspect behavior may include identifying which of the one or more fields of each containing class exhibits constant growth behavior in the size over the interval. Still further, identifying which of the one or more fields of each containing class exhibit suspect behavior may include identifying which of the one or more fields of each containing class are suspected of exhibiting a potential growth trend.

In an implementation, the method 200 may include searching for and discovering the one or more containing classes including class instances and class objects having the at least one static or non-static fields of collection or array type. Further, in another implementation, the method 200 may include storing information for, or at least related to, the one or more containing classes. For example, the method 200 may include storing information for each containing class instance having suspected memory leaks. In another example, the method 200 may include storing information for each of the one or more fields of each containing class instance that are identified to exhibit suspect behavior in the size over the interval. The method 200 may further include storing information for each result that pinpoints a suspected memory leak to a specific field in a specific instance of a specific containing class.

In an implementation, the method 200 may include storing information for or at least related to the one or more classes (containers or containing classes) including monitoring, identifying, accessing, tracking, processing, acquiring, receiving, and/or detecting various aspects of each class (container or containing class) in relation to performing the operations 202-212 of the method 200.

The described process of the method 200 in the example of FIG. 2 may be configured to detect memory leaks that may result from growth of collection fields or array type fields by tracking their sizes through the containing classes. This way, in some examples, only the classes identified to contain collections or arrays may be tracked. The sizes of the collection and/or arrays may be tracked and checked periodically with less impact on performance. These periodical size samplings may be used by an algorithm for deciding if there is a possible or potential memory leak. The output of this process may be the potential memory leaks with information regarding not only the collection and/or array that is suspect, but regarding the containing class and the specific instance containing the field suspected of being a memory leak.

Figure 3:
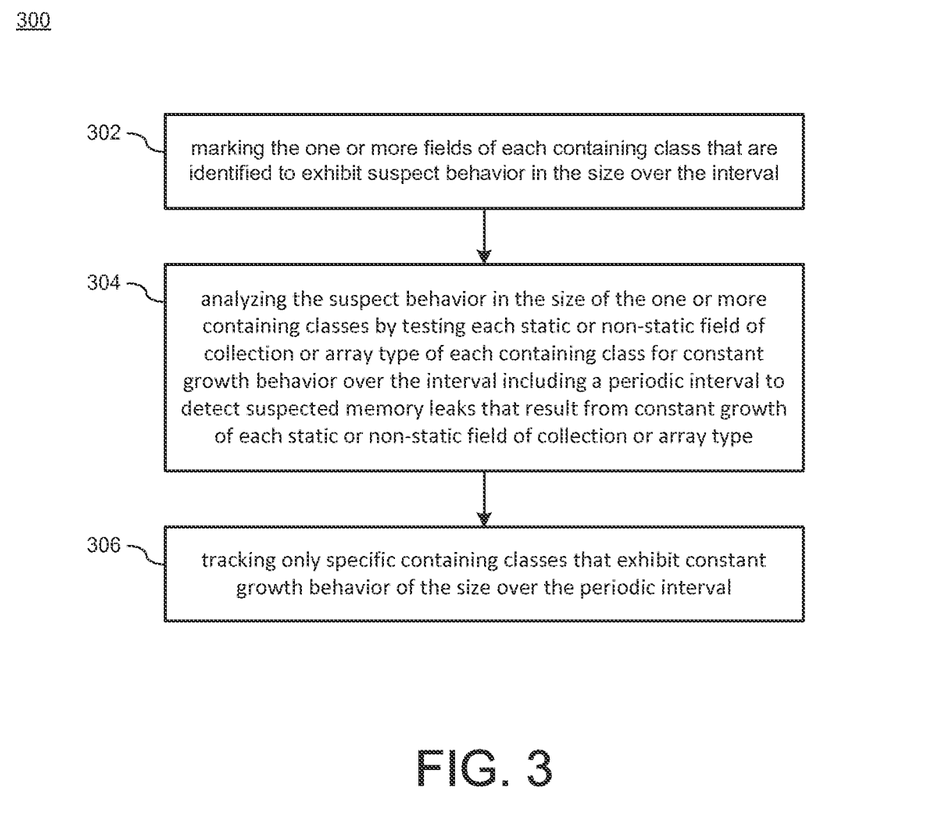
FIG. 3 is a process flow diagram illustrating another example method for memory leak detection, in accordance with aspects of the disclosure.

FIG. 3 is a process flow illustrating another example method 300 for memory leak detection, in accordance with aspects of the disclosure.

In the example of FIG. 3, operations 302-306 are illustrated as a series of discrete operations occurring in sequential order. However, in other implementations, two or more of the operations 302-306 may occur in a partially or completely overlapping or parallel manner, or in a nested or looped manner, or may occur in a different order than that shown. Further, additional operations, that may not be specifically shown in the example of FIG. 3, may be included in some other implementations, while, in still other implementations, one or more of the operations 302-306 may be omitted.

Moreover, in various other implementations, the method 300 may include a process flow for a computer-implemented method for memory leak detection in the system 100 of FIG. 1. Further, as described herein, the operations 302-306 may provide a simplified operational process flow that may be enacted by the computer device 104 to provide features and functionalities as described in reference to FIG. 1.

In the example of FIG. 3, at 302, the method 300 may include marking the one or more fields of each containing class that are identified to exhibit suspect behavior in the size over the interval. At 304, the method 300 may include analyzing the suspect behavior in the size of the one or more containing classes by testing each static or non-static field of collection or array type of each containing class for constant growth behavior over the interval including a periodic interval to detect suspected memory leaks that result from constant growth of each static or non-static field of collection or array type. In some implementations, the method 300 may utilize an algorithm that is simple and efficient; however, in some other implementations, another more elaborate algorithm may be utilized to establish a normal baseline usage and identify abnormalities. At 306, the method 300 may include tracking only specific containing classes that exhibit constant growth behavior of the size over the periodic interval.

In an implementation, the method 300 may include storing information for or at least related to the one or more containing classes including marking, analyzing, testing, and tracking various aspects of each containing class in relation to performing the operations 302-306 of the method 300.

Figure 4:
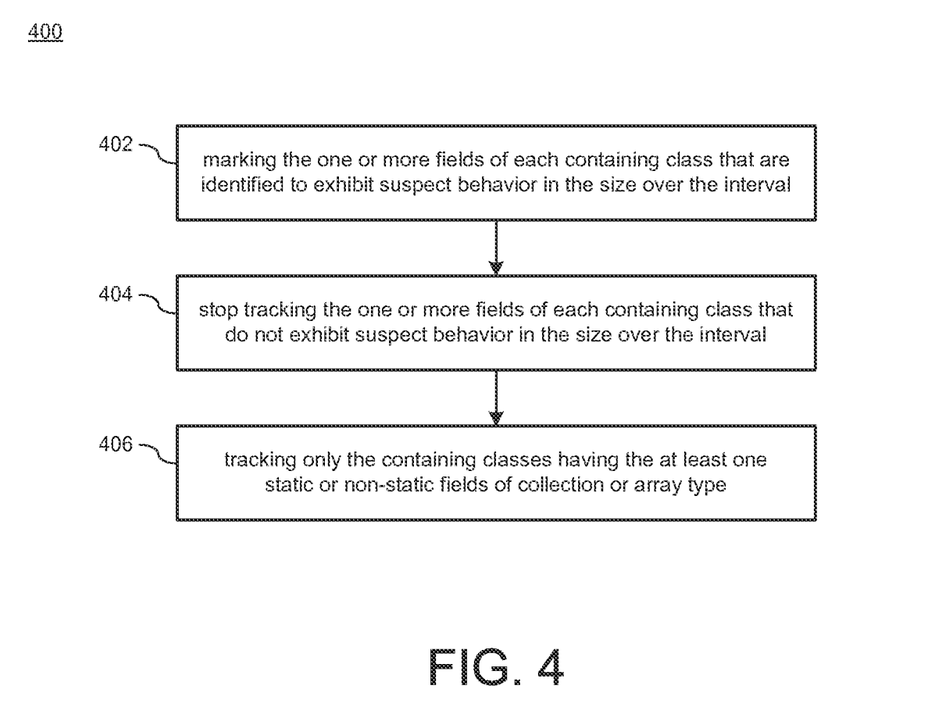
FIG. 4 is a process flow diagram illustrating another example method for memory leak detection, in accordance with aspects of the disclosure.

FIG. 4 is a process flow illustrating another example method 400 for memory leak detection, in accordance with aspects of the disclosure.

In the example of FIG. 4, operations 402-406 are illustrated as a series of discrete operations occurring in sequential order. However, in other implementations, two or more of the operations 402-406 may occur in a partially or completely overlapping or parallel manner, or in a nested or looped manner, or may occur in a different order than that shown. Further, additional operations, that may not be specifically shown in the example of FIG. 4, may be included in some other implementations, while, in still other implementations, one or more of the operations 402-406 may be omitted.

Moreover, in various other implementations, the method 400 may include a process flow for a computer-implemented method for memory leak detection in the system 100 of FIG. 1. Further, as described herein, the operations 402-406 may provide a simplified operational process flow that may be enacted by the computer device 104 to provide features and functionalities as described in reference to FIG. 1.

In the example of FIG. 4, at 402, the method 400 may include marking the one or more fields of each containing class that are identified to exhibit suspect behavior in the size over the interval. At 404, the method 400 may include stopping tracking of the one or more fields of each containing class that do not exhibit suspect behavior in the size over the interval. At 406, the method 400 may include tracking only the containing classes having the at least one static or non-static field of collection or array type.

In an implementation, the method 400 may include storing information for or at least related to the one or more containing classes including marking and tracking (including stopping the tracking of) various aspects of each containing class in relation to performing the operations 402-406 of the method 400.

Figure 5:
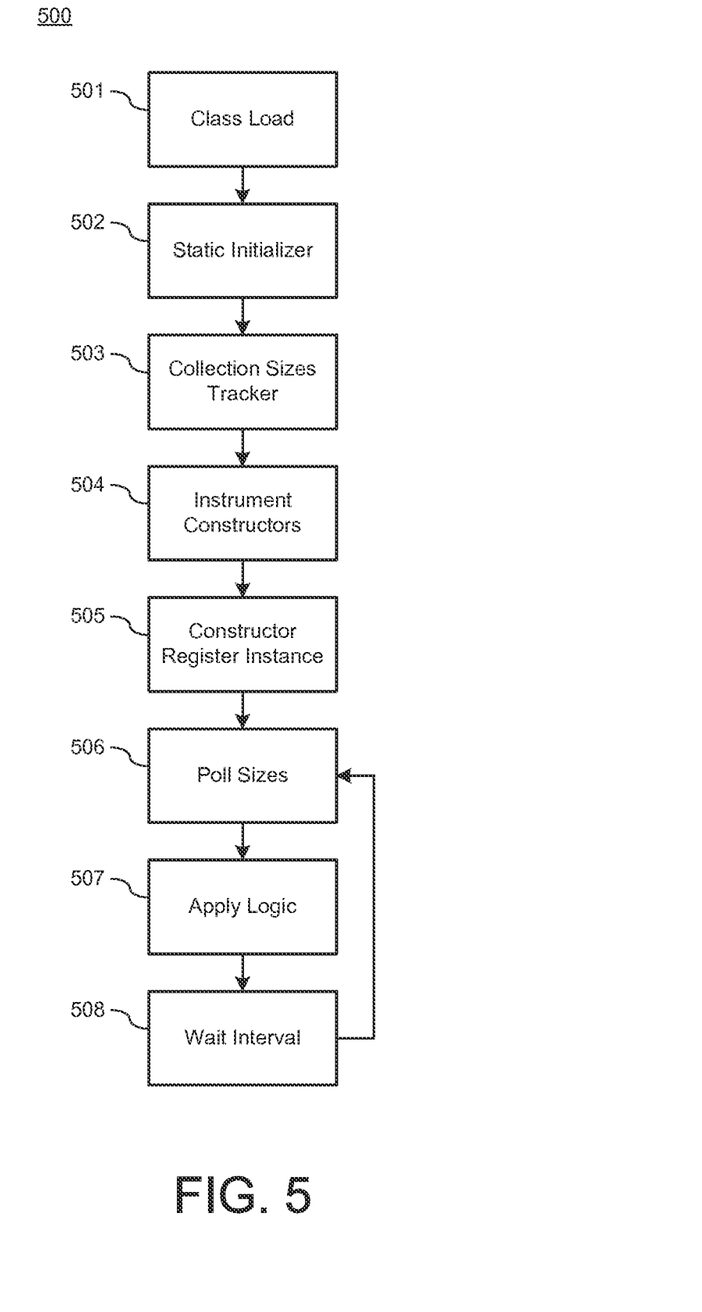
FIG. 5 is a process flow diagram illustrating another example method for memory leak detection, in accordance with aspects of the disclosure.

FIG. 5 is a process flow illustrating another example method 500 for memory leak detection, in accordance with aspects of the disclosure.

In the example of FIG. 5, operations 501-508 are illustrated as a series of discrete operations occurring in sequential order. However, in other implementations, two or more of the operations 501-508 may occur in a partially or completely overlapping or parallel manner, or in a nested or looped manner, or may occur in a different order than that shown. Further, additional operations, that may not be specifically shown in the example of FIG. 5, may be included in some other implementations, while, in still other implementations, one or more of the operations 501-508 may be omitted.

Moreover, in various other implementations, the method 500 may include a process flow for a computer-implemented method for memory leak detection in the system 100 of FIG. 1. Further, as described herein, the operations 501-508 may provide a simplified operational process flow that may be enacted by the computer device 104 to provide features and functionalities as described in reference to FIG. 1.

In the example of FIG. 5, the process of method 500 may be configured to detect memory leaks that may result from growth of collections and/or arrays by tracking their sizes through the containing classes holding them. As such, in an example, only the containing classes identified to contain collections and/or arrays are tracked. In some examples, the sizes of the collections and/or arrays may be checked periodically without negatively impacting performance. These periodical size samplings may be used as input to an algorithm for determining if there is a possible memory leak. The output of this process may provide information related to potential memory leaks including information relating to not only the collection and/or array that may be suspect (i.e., suspected of memory leaks), but also relating to the containing class and related instances. In various examples, aspects of the disclosure may be configured to build on the existence of byte code instrumentation infrastructure.

In the example of FIG. 5, at 501, the method 500 may include class load in reference to an instrument static initializer. For instance, on class load, the process may be configured to modify a static initializer (or generate the static initializer, if none exists) to register a class or classes (including user classes) with modified code for identifying one or more classes that may have potential memory leaks.

At 502, the method 500 may include instrumentation of a static initializer, and further at 502, the method 500 may include using the static initializer to register the class(es) with modified code. For instance, when code in a class's static initializer is executed, it may register itself with the modified code. In an example, it may register the class in a CollectionSizesTracker class, which may be a singleton. Further, when the class is initialized, the modified static initializer may register the class in an agent. In another example, after recognizing that a class is interesting, the method 500 may include instrumenting its constructors to register the class with the CollectionSizesTracker class, which may include utilizing an instrumentation bit.

At 503, the method 500 may include checking for collection and/or array members in the registered class(es). For instance, the CollectionSizesTracker class or the instrumentation manger may be configured to analyze the class(es) and look for members that are either assignable to a collection interface or that are array types. In an example, if such fields are non-existent, then the class is not considered interesting and may be ignored. In another example, if there are such fields (either static or not), than the class is considered interesting, and it and its collection/array fields may be accessed per instance (e.g., with weak references so that this class may be garbage collected, when necessary). Further, in another example, the class's fields or members may be tested to see if there are collection fields in it.

At 504, the method 500 may include applying, implementing, and/or using instrument constructors. For instance, if the class (e.g., containing class) was considered interesting, then its constructors may be instrumented to register any newly created or generated instance of this class with the CollectionSizesTracker class.

At 505, the method 500 may include a constructor for registering instances of the class(es). For instance, when the instrumented constructor's code is executed, it may register the new instance(s) with the CollectionSizesTracker class, whereby a (weak) reference to the newly created instance may be kept, as described herein. Further, when an object of a class is created, the instrumented constructor may register the instance.

At 506, the method 500 may include poll sizes or polling a size of the collection and/or array of each class including containing class. For instance, the process may be configured to go through all classes registered in the CollectionSizesTracker class and check the sizes of the collection and/or array static fields. In another instance, the process may be configured to go through all registered instances of each class and check the sizes of the non-static fields, of collection and/or array type. Further, the sizes of all the collection fields of each class may be periodically tested for suspect behavior, such as, for example, increasing growth, including constant growth or varying growth.

At 507, the method 500 may include applying logic. For instance, in the current sample and/or previous samples, the process may be configured to determine, decide, and/or identify which class instances are not interesting and should not be tracked any further. As such, uninteresting or non-interesting class instances may no longer be tracked, and therefore, tracking of these instances or classes that do not show memory leak characteristics or behavior may be stopped. In another instance, the process may be configured to indicate which classes and/or instances of classes that, according to a tracked time interval and size samples, are interesting and suspect of showing growth.

In an implementation, the apply logic operation 507 may be configured to provide a basic algorithm intended to detect memory leaks. For instance, the algorithm for memory leak detection may be configured to identify containers (containing classes) instances with collections and/or arrays that exhibit suspect behavior (e.g., constant growth) in size and mark these identified containers (containing classes) as potential memory leaks. In another instance, other containers (containing classes), not showing suspect behavior over a few samples, may be discarded, and their sizes may not be polled any further.

At 508, the method 500 may include further poll sizes or further polling size(s) of the collection(s) and/or array(s) of class(es) including containing class(es). For instance, the process may be configured to wait a selectively configurable time interval (e.g., any periodic time interval including, for example, second(s), minute(s), etc.) and go back to operation or stage 506. In an implementation, by repetitively running through operations 506, 507, 508, the CollectionSizesTracker class may be configured to hold, at any time, the list of classes/instances that may be suspect of being a memory leak.

In an implementation, according to the example of FIG. 5, the method 500 may include a polling process or a polling mechanism that may be configured to enable processing (e.g., acquiring, receiving, etc.) classes (containers or containing classes) and may be configured to further enable polling of their static or non-static field sizes of collection or array type. Further, according to the example of FIG. 5, the method 500 may include an algorithm process or algorithm handler that enables detecting memory leaks from the polled sizes data. In some other implementations, the algorithm may be replaced by any other algorithm that uses sampled collection sized data and allows for addressing a broader set of problems and not only memory leak detection.

Further, in another implementation, the method 500 may be configured to determine a baseline memory usage for classes and/or instances and to detect abnormal behavior in terms of memory consumption. The method 500 may be further configured to provide results pinpointing one or more problems associated with a specific field of collection or array type in a specific class instance.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for managing usage of memory by an application running on a computer, the method comprising:

performing a first sampling of size data of classes of the application over a first time interval;

determining a list of classes that show a memory leak behavior based on the first sampling of size data;

storing the list of classes suspected of the memory leak behavior during a first wait interval;

following the first wait interval, performing a second sampling of size data of the list of classes over a second time interval;

determining the memory leak behavior of the list of classes, based on a comparison of the first sampling of size data and the second sampling of size data, the memory leak behavior indicating either a growing trend of at least one memory leak metric, or a decreasing trend of the at least one memory leak metric;

selecting a second wait interval that is shorter than the first wait interval when the memory leak behavior indicates the growing trend, or selecting a second wait interval that is longer than the first wait interval when the memory leak behavior indicates the decreasing trend;

storing the list of classes during the second wait interval;

following the second wait interval, performing a third sampling of size data of the list of classes over a third time interval; and determining updated memory leak behavior of the list of classes, based on the second sampling of size data and the third sampling of size data.

2. The computer-implemented method of claim 1, wherein each class of the list of classes includes at least one of a static field and a non-static field.

3. The computer-implemented method of claim 1, further comprising modifying code for a class of the list of classes including a specific field exhibiting the memory leak behavior in its tracked size.

4. The computer-implemented method of claim 1, further comprising:

marking a specific field of a class of the list of classes exhibiting the memory leak behavior in its tracked size.

5. The computer-implemented method of claim 1, wherein determining memory leak behavior of the list of classes comprises monitoring the classes in a production environment.

6. The computer-implemented method of claim 1, wherein at least one field included in each class of the list of classes enables an instance of the class to maintain at least one of a state and a behavior.

7. The computer-implemented method of claim 1, wherein the tracked sizes include a number of objects held by at least one field.

8. The computer-implemented method of claim 1, wherein determining memory leak behavior of the list of classes includes identifying at least one field as exhibiting constant growth behavior in the tracked sizes.

9. The computer-implemented method of claim 1, further comprising sampling, over the first time interval the second time interval, and the third size interval, the size of a field, each sample being a result including size data for the field.

10. The computer-implemented method of claim 9, wherein the method further comprises storing information for each class of the list of classes flagging a field in a class of the list of classes as exhibiting the memory leak behavior.

11. A computer program product for managing usage of memory by an application running on a computer, the computer program product being tangibly embodied on a non-transitory computer-readable medium and comprising instructions that, when executed by at least one processor, are configured to:

perform a first sampling of size data of classes of the application over a first time interval;

determine a list of classes that show a memory leak behavior based on the first sampling of size data;

store the list of classes suspected of the memory leak behavior during a first wait interval;

following the wait interval, perform a second sampling of size data of the list of classes over a second time interval;

determine the memory leak behavior of the list of classes, based on a comparison of the first sampling of size data and the second sampling of size data, the memory leak behavior indicating either a growing trend of at least one memory leak metric, or a decreasing trend of the at least one memory leak metric;

select a second wait interval that is shorter than the first wait interval when the memory leak behavior indicates the growing trend, or to select a second wait interval that is longer than the first wait interval when the memory leak behavior indicates the decreasing trend;

store the list of classes during the second wait interval;

following the second wait interval, perform a third sampling of size data of the list of classes over a third time interval; and determine updated memory leak behavior of the list of classes, based on the second sampling of size data and the third sampling of size data.

12. The computer program product of claim 11, wherein the each class of the list of classes includes at least one of a static field and a non-static field.

13. The computer program product of claim 11, wherein at least one field included in each class of the list of classes enables an instance of the class to maintain at least one of a state and a behavior.

14. The computer program product of claim 11, wherein the tracked sizes includes a number of objects held by at least one field.

15. The computer program product of claim 11, wherein the instructions configured to determine memory leak behavior of the list of classes include instructions that, when executed by at least one processor, are configured to identify at least one field as exhibiting constant growth behavior in the tracked sizes.

16. The computer program product of claim 11, wherein the instructions configured to determine memory leak behavior of the list of classes include instructions that, when executed by at least one processor, are configured to sample, over the first time interval and the second time interval, the size of at least one field, each sample being a result including size data for the at least one field.

17. The computer program product of claim 16, wherein the instructions, when executed by at least one processor, are further configured to store information for each class of the list of classes flagging a field in a class of the list of classes as exhibiting the memory leak behavior.

18. A system for managing usage of memory by an application running on a computer, the system including instructions stored on a non-transitory computer readable storage medium and executable by at least one processor, the system comprising:

a polling mechanism configured to perform a first sampling of size data of classes of the application over a first time interval, and, following a first wait interval, performing a second sampling of size data of the list of classes over a second time interval;

a storage handler configured to store the list of classes suspected of memory leak behavior during the first wait interval; and an algorithm handler configured to determine the memory leak behavior, based on a comparison of the first sampling of size data and the second sampling of size data, the memory leak behavior indicating either a growing trend of at least one memory leak metric, or a decreasing trend of the at least one memory leak metric, wherein the polling mechanism is further configured to select a second wait interval that is shorter than the first wait interval when the memory leak behavior indicates the growing trend, or to select a second wait interval that is longer than the first wait interval when the memory leak behavior indicates the decreasing trend, the storage handler is further configured to store the list of classes during the second wait interval;

following the second wait interval, the polling mechanism is further configured to perform a third sampling of size data of the list of classes over a third time interval; and the algorithm handler is further configured to determine updated memory leak behavior of the list of classes, based on the second sampling of size data and the third sampling of size data.

19. The system of claim 18, wherein each class of the list of classes includes at least one of a static field and a non-static field.

20. The system of claim 18, wherein at least one field included in each class of the list of classes enables an instance of the classes to maintain at least one of a state and a behavior.

\* \* \* \* \*